US011894224B2

(12) United States Patent
Song et al.

(10) Patent No.: US 11,894,224 B2
(45) Date of Patent: Feb. 6, 2024

(54) HIGH VOLTAGE DRIVING DEVICE

(71) Applicant: ELECTRONICS AND TELECOMMUNICATIONS RESEARCH INSTITUTE, Daejeon (KR)

(72) Inventors: Yoon-Ho Song, Daejeon (KR); Jeong-Woong Lee, Daejeon (KR); Jun-Tae Kang, Daejeon (KR); Seong Jun Kim, Daejeon (KR); Jae-Woo Kim, Daejeon (KR); Sora Park, Daejeon (KR); Ki Nam Yun, Daejeon (KR); Jin-Woo Jeong, Daejeon (KR); Sunghoon Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/834,463

(22) Filed: Jun. 7, 2022

(65) Prior Publication Data

US 2022/0399176 A1 Dec. 15, 2022

(30) Foreign Application Priority Data

Jun. 9, 2021 (KR) ........................ 10-2021-0074869
May 11, 2022 (KR) ........................ 10-2022-0057608

(51) Int. Cl.
*H01J 5/04* (2006.01)

(52) U.S. Cl.
CPC ..................................... *H01J 5/04* (2013.01)

(58) Field of Classification Search
CPC ......................................................... H01J 5/04
See application file for complete search history.

(56) References Cited

U.S. PATENT DOCUMENTS

| | | | |
|---|---|---|---|
| 4,396,861 A | 8/1983 | Hoffmeister et al. | |
| 6,051,838 A | 4/2000 | Frosien et al. | |
| 10,170,273 B2 | 1/2019 | Ichimura et al. | |
| 10,825,641 B2 | 11/2020 | Ishii et al. | |
| 2013/0140977 A1 | 6/2013 | Watanabe et al. | |
| 2013/0284948 A1 | 10/2013 | Iwamoto | |
| 2014/0103223 A1 | 4/2014 | Tsunoda | |
| 2014/0161232 A1 | 6/2014 | Jeong et al. | |
| 2018/0247787 A1 * | 8/2018 | Jeong | H01J 35/045 |

(Continued)

FOREIGN PATENT DOCUMENTS

| | | |
|---|---|---|
| JP | 29-2533 | 5/1954 |
| JP | H10-268096 A | 10/1998 |
| JP | 2009064710 A | 3/2009 |

(Continued)

*Primary Examiner* — Anne M Hines

(57) ABSTRACT

Provided is a high voltage driving device including a housing and a cathode, an anode, and an insulation structure, which are disposed in the housing. Here, the cathode and the anode are spaced apart from each other with the insulation structure therebetween. Also, the insulation structure includes a first solid insulator disposed adjacent to the cathode and a second solid insulator disposed adjacent to the anode. Also, the first solid insulator has first volumetric resistivity less than second volumetric resistivity of the second solid insulator, and the first solid insulator contacts the cathode.

18 Claims, 5 Drawing Sheets

(56) References Cited

U.S. PATENT DOCUMENTS

2021/0166909 A1* 6/2021 Song .................... H01J 35/045

FOREIGN PATENT DOCUMENTS

| | | | |
|---|---|---|---|
| JP | 2013-4216 | A | 1/2013 |
| KR | 10-2008-0008941 | A | 1/2008 |
| KR | 10-2009-0002564 | A | 1/2009 |
| KR | 10-2019-0119528 | A | 10/2019 |
| WO | 2012/014370 | A1 | 2/2012 |
| WO | 2012/091062 | A1 | 7/2012 |
| WO | 2016/117628 | A1 | 7/2016 |

* cited by examiner

HIGH VOLTAGE DRIVING DEVICE

CROSS-REFERENCE TO RELATED APPLICATIONS

This U.S. non-provisional patent application claims priority under 35 U.S.C. § 119 of Korean Patent Application Nos. 10-2021-0074869, filed on Jun. 9, 2021, and 10-2022-0057608, filed on May 11, 2022, the entire contents of which are hereby incorporated by reference.

BACKGROUND

The present disclosure herein relates to a high voltage driving device.

In the field of a high voltage driving device such as an x-ray tube, a vacuum interrupter, an electron microscope, and a power transmission line, a high voltage of several tens to several hundreds kV is applied between two electrodes, and insulation between the two electrodes is maintained by providing a solid insulator such as ceramic, insulating oil, vacuum, or a gas between the two electrodes. Particularly, when insulation is performed by inserting the solid insulator between the two electrodes, an extremely simple structure may be realized with low costs.

SUMMARY

The present disclosure provides a high voltage driving device that is stably driven even at a high voltage.

An embodiment of the inventive concept provides a high voltage driving device including: a housing; and a cathode, an anode, and an insulation structure, which are disposed in the housing. Here, the cathode and the anode are spaced apart from each other with the insulation structure therebetween. Also, the insulation structure includes: a first solid insulator disposed adjacent to the cathode; and a second solid insulator disposed adjacent to the anode. Also, the first solid insulator has first volumetric resistivity less than second volumetric resistivity of the second solid insulator, and the first solid insulator contacts the cathode.

In an embodiment, a voltage of about 10 kV or more may be applied between the cathode and the anode.

In an embodiment, the inside of the housing may have a vacuum atmosphere or a gas atmosphere.

In an embodiment, each of the first solid insulator and the second solid insulator may include a ceramic material having different volumetric resistivity.

In an embodiment, each of the first solid insulator and the second solid insulator may include at least one of alumina ($Al_2O_3$), zirconia ($ZrO_2$), and yttria ($Y_2O_3$).

In an embodiment, the first solid insulator and the second solid insulator may include the same ceramic material and an impurity doped in the ceramic material, and the impurity doped in the first solid insulator may have a concentration greater than that of the impurity doped in the second solid insulator.

In an embodiment, each of the first solid insulator and the second solid insulator may include alumina ($Al_2O_3$) and titania ($TiO_2$) doped in the alumina, the titania doped in the alumina of the first solid insulator may have a concentration of about 2% or more, and the titania doped in the alumina of the second solid insulator may have a concentration less than about 2%.

In an embodiment, the second solid insulator may contact the anode.

In an embodiment of the inventive concept, a high voltage driving device includes: a housing; and a first electrode, a second electrode, and an insulation structure, which are disposed in the housing. Here, the first electrode and the second electrode are spaced apart from each other with the insulation structure therebetween. Also, the insulation structure includes: a pair of first solid insulators respectively disposed adjacent to the first electrode and the second electrode; and a second solid insulator disposed between the first solid insulators. Also, the first solid insulator has first volumetric resistivity or first permittivity less than second volumetric resistivity or second permittivity of the second solid insulator, and the first solid insulators respectively contact the first electrode and the second electrode.

In an embodiment, the high voltage driving device may further include a power supply connected to the first electrode and the second electrode and supplying a power, and the power supply may change a direction of an electric field between the first electrode and the second electrode.

In an embodiment, the inside of the housing may have a vacuum atmosphere or a gas atmosphere, and a voltage of about 10 kV or more may be applied between the first electrode and the second electrode.

In an embodiment, the second solid insulator may be spaced apart from all of the first electrode and the second electrode.

In an embodiment, each of the first solid insulator and the second solid insulator may include a ceramic material having different volumetric resistivity or permittivity.

In an embodiment, the first solid insulator and the second solid insulator may include the same ceramic material and an impurity doped in the ceramic material, and the impurity doped in the first solid insulator may have a concentration greater than that of the impurity doped in the second solid insulator.

In an embodiment, each of the first solid insulator and the second solid insulator may include alumina ($Al_2O_3$) and titania ($TiO_2$) doped in the alumina, the titania doped in the alumina of the first solid insulator may have a concentration of about 2% or more, and the titania doped in the alumina of the second solid insulator may have a concentration less than about 2%.

BRIEF DESCRIPTION OF THE FIGURES

The accompanying drawings are included to provide a further understanding of the inventive concept, and are incorporated in and constitute a part of this specification. The drawings illustrate embodiments of the inventive concept and, together with the description, serve to explain principles of the inventive concept. In the drawings.

DETAILED DESCRIPTION

Hereinafter, embodiments of the present invention will be described with reference to the accompanying drawings so as to sufficiently understand constitutions and effects of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. In addition, the sizes of the elements and the relative sizes between elements may be exaggerated for further understanding of the present invention.

Figure 1:
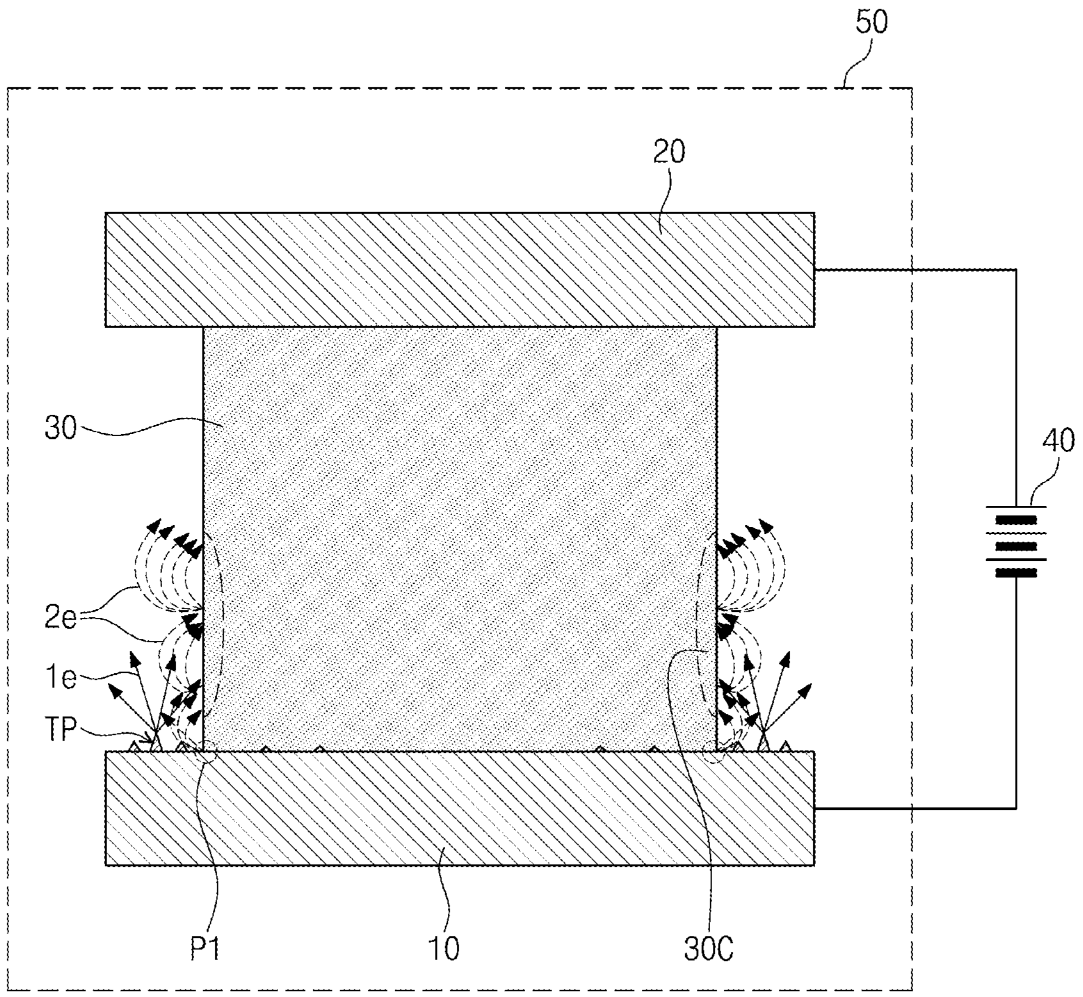
FIGS. 1 and 2 are schematic cross-sectional views illustrating a high voltage driving device.
Figure 2:
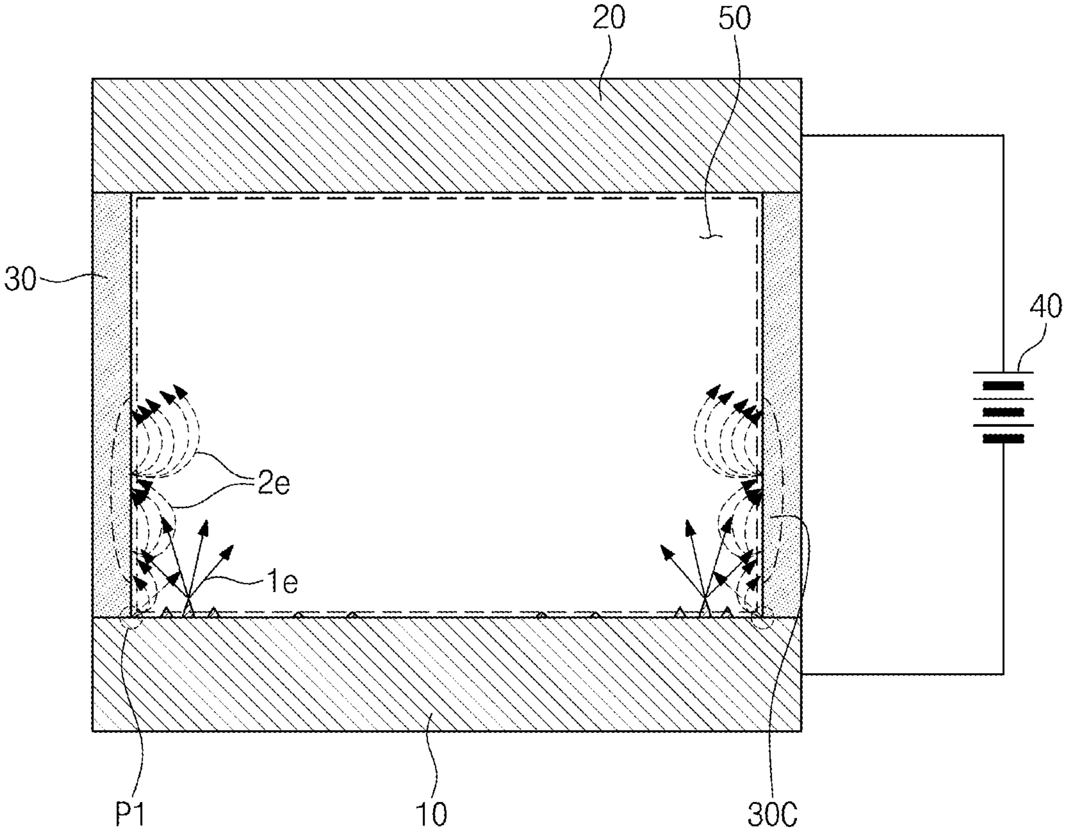

FIGS. 1 and 2 are schematic cross-sectional views illustrating a high voltage driving device. The high voltage driving device may include, e.g., an X-ray tube, a vacuum interrupter, an electron microscope, and a power transmission line.

Referring to FIG. 1, the high voltage driving device may include a first electrode 10, a second electrode 20, an insulation structure 30, and a housing 50.

The first electrode 10 and the second electrode 20 may be electrically connected to a high voltage power supply 40 disposed outside the housing 50.

The high voltage power supply 40 may determine a direction of an electric field between the first electrode 10 and the second electrode 20. Here, the first electrode 10 may a cathode 10, and the second electrode 20 may an anode 20. The high voltage power supply 40 may apply a high voltage of several tens to several hundreds kV between the cathode 10 and the anode 20 and induce an electric field having a strong intensity.

The housing 50 may be a space surrounding the cathode 10, the anode 20, and the insulation structure 30 or a shape thereof. For example, the housing 50 may be a vacuum chamber or a chamber filled with a gas.

The insulation structure 30 may include a solid insulator. The insulation structure 30 may include, e.g., a ceramic material. The insulation structure 30 may insulate the first electrode 10 and the second electrode 20 from each other. The insulation structure 30 may contact the cathode 10 and the anode 20. The insulation structure 30 may have various shapes. According to some embodiments, the insulation structure 30 may have a hollow cylindrical tube shape as illustrated in FIG. 2. The inside 30C of the insulation structure 30 may have a vacuum atmosphere or a gas atmosphere.

Primary electrons 1*e* may be generated by an electric field having a strong intensity at a triple point (or triple junction) P1 at which the cathode 10, the insulation structure 30, and vacuum (or gas) meet each other or a micro-protrusion TP (natural formation) of the cathode 10. A portion of the primary electrons 1*e* may collide with the insulation structure 30, and secondary electrons 2*e* may be generated from a surface of the insulation structure 30. A charging region 30*e* may be generated on the surface of the insulation structure 30 through the generation of the secondary electrons 2*e*. When the charging region 30*e* is generated, insulation between the cathode 10 and the anode 20 may not be properly performed.

Figure 3:
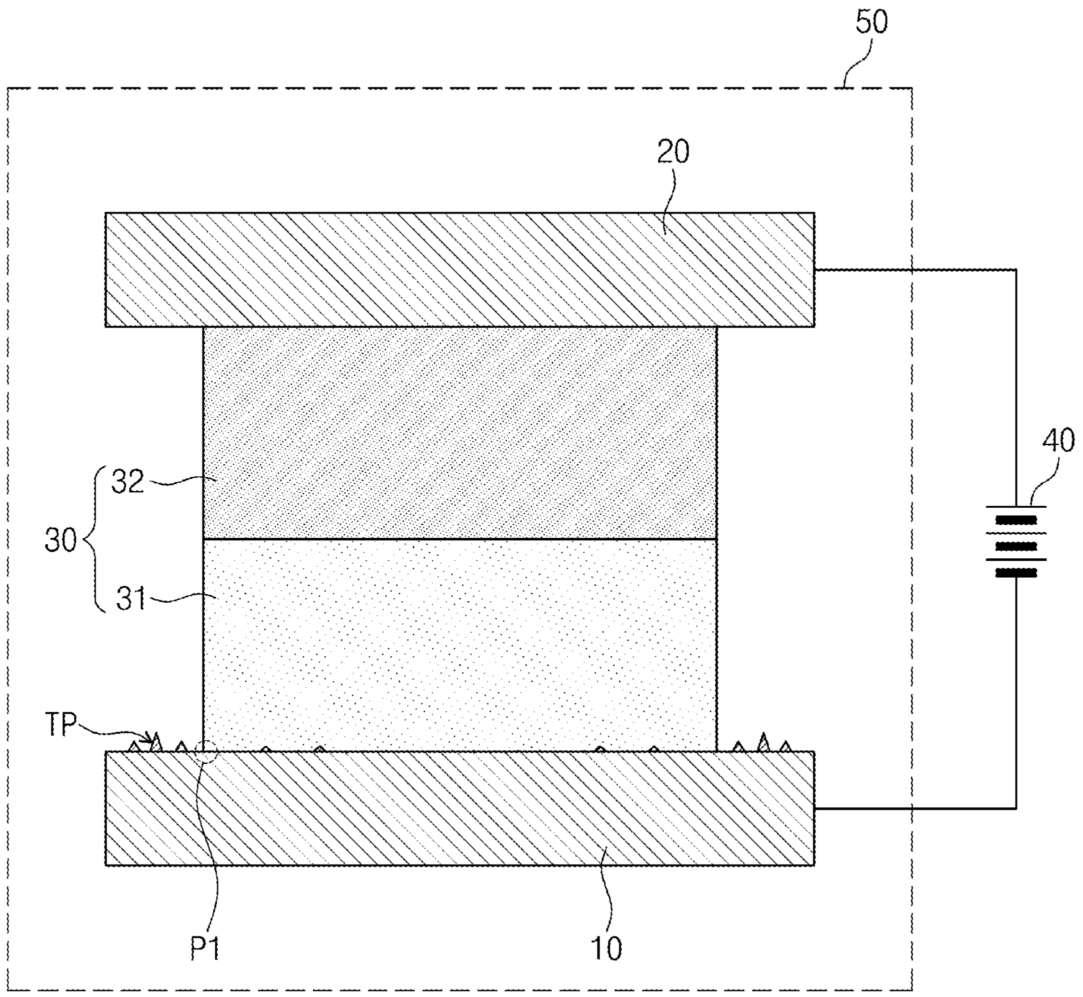
FIG. 3 is a cross-sectional view illustrating a structure of the high voltage driving device according to an embodiment of the inventive concept.

FIG. 3 is a cross-sectional view illustrating a structure of a high voltage driving device according to an embodiment of the inventive concept. Since the above-described features may be applied in the same manner except for features to be described hereinafter, overlapped descriptions will be omitted.

The high voltage driving device according to an embodiment of the inventive concept may include an insulation structure 30 including a first solid insulator 31 and a second solid insulator 32. The first solid insulator 31 may be disposed adjacent to the cathode 10, and the second solid insulator 32 may be disposed adjacent to the anode 20. The first solid insulator 31 may contact the cathode 10, and the second solid insulator 32 may contact the anode 20. The first solid insulator 31 may have first volumetric resistivity or first permittivity. The second solid insulator 32 may have second volumetric resistivity or second permittivity. The first volumetric resistivity may be less than the second volumetric resistivity. The first permittivity may be less than the second permittivity.

The first solid insulator 31 and the second solid insulator 32 may include ceramic materials having different resistivity. Alternatively, each of the first solid insulator 31 and the second solid insulator 32 may include the same ceramic material and an impurity doped in the ceramic material, and a concentration of the impurity doped in the first solid insulator 31 may be greater than that of the impurity doped in the second solid insulator 32.

Each of the first solid insulator 31 and the second solid insulator 32 may include a ceramic material such as alumina ($Al_2O_3$), zirconia ($ZrO_2$), and yttria ($Y_2O_3$). The impurity may be, e.g., titania ($TiO_2$).

For example, each of the first solid insulator 31 and the second solid insulator 32 may include alumina ($Al_2O_3$) and titania ($TiO_2$) doped in the alumina, the titania ($TiO_2$) doped in the alumina of the first solid insulator 31 may have a concentration equal to or greater than about 2%, and the titania ($TiO_2$) doped in the alumina of the first solid insulator 31 may have a concentration less than about 2%.

The first solid insulator 31 may have resistivity of less than about $1\times10^{12}$ Ω·cm, and the second solid insulator 32 may have resistivity of about $1\times10^{12}$ Ω·cm or more.

According to an embodiment of the inventive concept, a high voltage of several tens to several hundreds kV between the cathode 10 and the anode 20 may be generally applied to the second solid insulator 32 having high volumetric resistivity (or permittivity) to insulate the cathode 10 and the anode 20 from each other (volumetric insulation). Since the first solid insulator 31 has high electrical conductivity, the first solid insulator 31 may weaken an electric field at the triple point P1 and suppress electron generation at the triple point P1. Also, although electrons generated from the micro-protrusion TP of the cathode 10 collide with the first solid insulator 31, a charging phenomenon of the surface of the first solid insulator 31 may be suppressed (surface insulation). Thus, according to an embodiment of the inventive concept, the high voltage driving device may have an excellent insulation property even under a high voltage by including the insulation structure 30 including the first solid insulator 31 and the second solid insulator 32 and respectively performing the volumetric insulation and the surface insulation.

Figure 4:
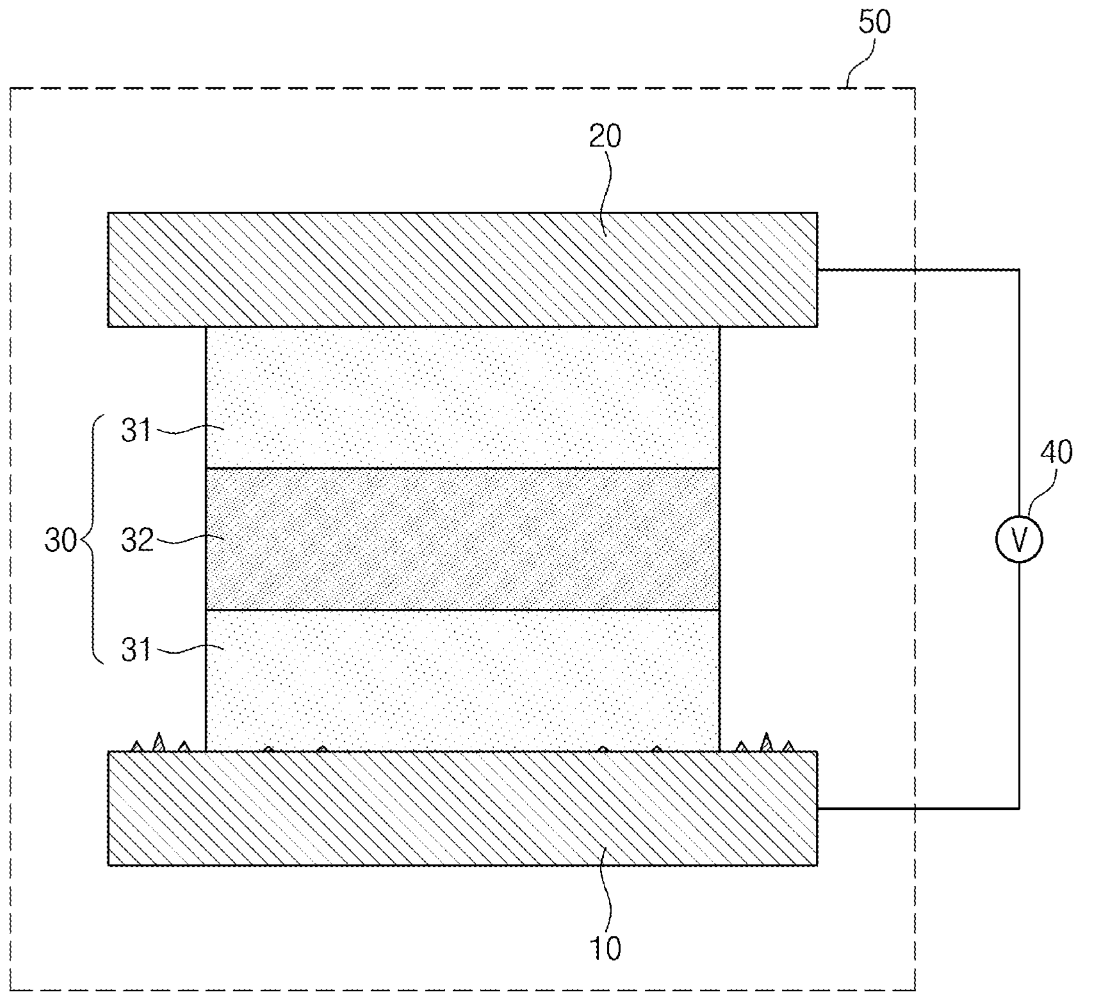
FIG. 4 is a cross-sectional view illustrating a structure of the high voltage driving device according to an embodiment of the inventive concept.

FIG. 4 is a cross-sectional view illustrating a structure of a high voltage driving device according to an embodiment of the inventive concept. Since the above-described features may be applied in the same manner except for features to be described hereinafter, overlapped descriptions will be omitted.

Referring to FIG. 4, the first electrode 10 and the second electrode 20 may not be respectively fixed as a cathode and an anode. The high voltage power supply 40 may change a direction of an electric field induced between the first electrode 10 and the second electrode 20. Thus, the first electrode 10 and the second electrode 20 may respectively function as the cathode and the anode in a case, and the first electrode 10 and the second electrode 20 may respectively function as the anode and the cathode in another case.

The insulation structure 30 may include a pair of first solid insulators 31 and a second solid insulator 32 disposed therebetween. The first solid insulators 31 may respectively contact the first electrode 10 and the second electrode 20. Thus, the electron generation at the triple point of the second electrode 20, the first solid insulator 31, and the vacuum may be suppressed even when the second electrode 20 functions as the cathode. Also, the micro-protrusion may also exist on the surface of the second electrode, and the charging phenomenon at the surface of the first solid insulator 31 may be suppressed even when electrons generated from the micro-protrusion collide with the first solid insulator 31. The second solid insulator 32 disposed between the first solid insulators 31 may insulate the first electrode 10 and the second electrode 20 from each other.

Embodiment

A solid insulator of $Al_2O_3$-2% $TiO_2$ and a solid insulator of $Al_2O_3$-3% $TiO_2$, which have a tube shape, are formed by mixing each of about 2% and about 3% of titania ($TiO_2$) with alumina ($Al_2O_3$). The solid insulator of $Al_2O_3$-3% $TiO_2$ is disposed to contact a cathode, and the solid insulator of $Al_2O_3$-2% $TiO_2$ is disposed to contact an anode.

Comparative Example

Unlike the embodiment, the solid insulator of $Al_2O_3$-3% $TiO_2$ is disposed to contact the anode, and the solid insulator of $Al_2O_3$-2% $TiO_2$ is disposed to contact the cathode.

Experimental Example 1: Volumetric Resistivity Measurement

As a result of measuring the volumetric resistivity, the volumetric resistivity of the solid insulator of $Al_2O_3$-2% $TiO_2$ and the volumetric resistivity of the solid insulator of $Al_2O_3$-3% $TiO_2$ of the embodiment are respectively measured as about $6.8\times10^{12}$ Ω·cm and about $7.1\times10^{9}$ Ω·cm.

Experimental Example 1: Insulation Property Test

Figure 5:
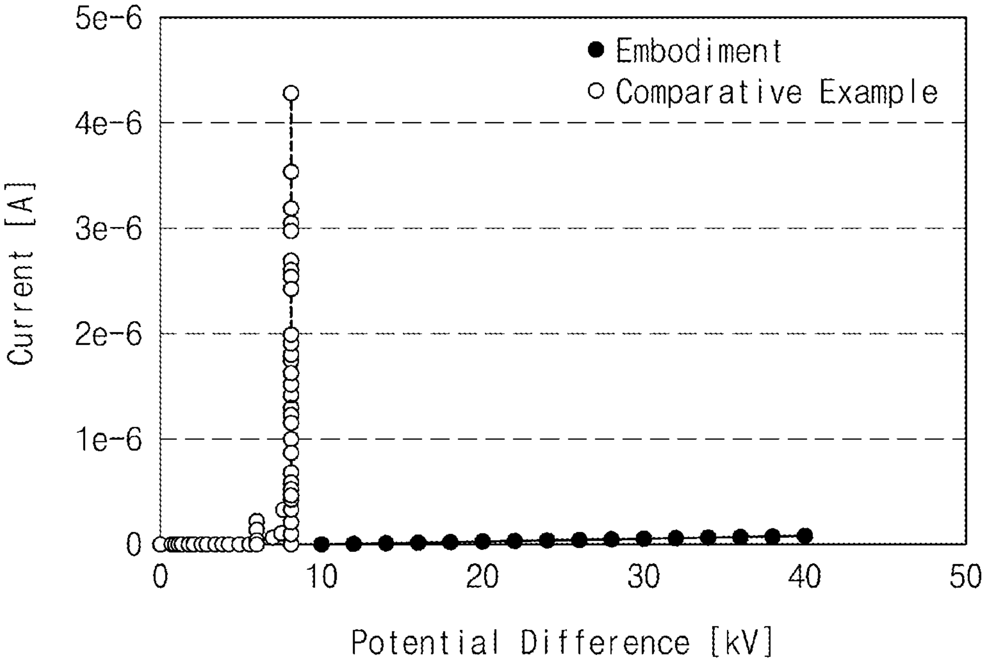
FIG. 5 is a graph showing the insulation property of each of the embodiment and the comparative example.

While a potential difference between the anode and the cathode of each of the embodiment and the comparative example increases, a current therebetween is measured. FIG. 5 is a graph showing an insulation property of each of the embodiment and the comparative example. Referring to FIG. 5, the embodiment exhibits an excellent insulation property in that a current almost does not flow even at a high voltage of about 40 kV or more while the comparative example shows a phenomenon in which insulation is broken around a voltage of about 10 kV.

According to an embodiment of the inventive concept, the insulation property of the high voltage driving device may be improved by providing the solid insulator having low volumetric resistivity (or permittivity) to the cathode and the solid insulator having high volumetric resistivity (or permittivity) to the anode.

According to the embodiment of the inventive concept, the insulation property of the high voltage driving device may be improved by providing the solid insulator having the low volumetric resistivity (or permittivity) to the cathode and the solid insulator having high volumetric resistivity (or permittivity) to the anode.

Although the embodiments of the present invention have been described, it is understood that the present invention should not be limited to these embodiments but various changes and modifications can be made by one ordinary skilled in the art within the spirit and scope of the present invention as hereinafter claimed.

What is claimed is:

1. A high voltage driving device comprising:

a housing; and a cathode, an anode, and an insulation structure, which are disposed in the housing, wherein the cathode and the anode are spaced apart from each other with the insulation structure therebetween, wherein the insulation structure comprises:

a first solid insulator disposed adjacent to the cathode; and a second solid insulator disposed adjacent to the anode, wherein the first solid insulator has first volumetric resistivity less than second volumetric resistivity of the second solid insulator, the first volumetric resistivity being sufficiently small to suppress a charging phenomenon on a surface of the first solid insulator, and the first solid insulator contacts the cathode.

2. The high voltage driving device of claim 1, wherein a voltage of about 10 kV or more is applied between the cathode and the anode.

3. The high voltage driving device of claim 1, wherein the inside of the housing has a vacuum atmosphere or a gas atmosphere.

4. The high voltage driving device of claim 1, wherein each of the first solid insulator and the second solid insulator comprises a ceramic material having different volumetric resistivity.

5. The high voltage driving device of claim 4, wherein each of the first solid insulator and the second solid insulator comprises any one of alumina ($Al_2O_3$), zirconia ($ZrO_2$), and yttria ($Y_2O_3$).

6. The high voltage driving device of claim 1, wherein the first solid insulator and the second solid insulator comprise the same ceramic material and an impurity doped in the ceramic material, and the impurity doped in the first solid insulator has a concentration greater than that of the impurity doped in the second solid insulator.

7. The high voltage driving device of claim 1, wherein the second solid insulator contacts the anode.

8. The high voltage driving device of claim 1, wherein the first solid insulator has the first volumetric resistivity less than about $1\times10^{12}$ Ω·cm.

9. The high voltage driving device of claim 1, wherein the first solid insulator has first permittivity less than second permittivity of the second solid insulator.

10. The high voltage driving device of claim 1, wherein each of the first solid insulator and the second solid insulator comprises alumina ($Al_2O_3$) and titania ($TiO_2$) doped in the alumina, the titania doped in the alumina of the first solid insulator has a concentration of about 2% or more.

11. A high voltage driving device comprising:

a housing; and a cathode, an anode, and an insulation structure, which are disposed in the housing, wherein the cathode and the anode are spaced apart from each other with the insulation structure therebetween, wherein the insulation structure comprises:

a first solid insulator disposed adjacent to the cathode; and a second solid insulator disposed adjacent to the anode, wherein the first solid insulator has first volumetric resistivity less than second volumetric resistivity of the second solid insulator, and the first solid insulator contacts the cathode, wherein each of the first solid insulator and the second solid insulator comprises alumina ($Al_2O_3$) and titania ($TiO_2$) doped in the alumina, the titania doped in the alumina of the first solid insulator has a concentration of about 2% or more, and the titania doped in the alumina of the second solid insulator has a concentration less than about 2%.

12. A high voltage driving device comprising:

a housing; and a first electrode, a second electrode, and an insulation structure, which are disposed in the housing, wherein the first electrode and the second electrode are spaced apart from each other with the insulation structure therebetween, wherein the insulation structure comprises:

a pair of first solid insulators respectively disposed adjacent to the first electrode and the second electrode; and a second solid insulator disposed between the first solid insulators, wherein the first solid insulator has first volumetric resistivity or first permittivity less than second volumetric resistivity or second permittivity of the second solid insulator, the first volumetric resistivity being sufficiently small to suppress a charging phenomenon on a surface of each of the first solid insulator, and wherein the first solid insulators respectively contact the first electrode and the second electrode.

13. The high voltage driving device of claim 12, further comprising a power supply connected to the first electrode and the second electrode and configured to supply a power, wherein the power supply changes a direction of an electric field between the first electrode and the second electrode.

14. The high voltage driving device of claim 12, wherein the inside of the housing has a vacuum atmosphere or a gas atmosphere, and a voltage of about 10 kV or more is applied between the first electrode and the second electrode.

15. The high voltage driving device of claim 12, wherein the second solid insulator is spaced apart from both of the first electrode and the second electrode.

16. The high voltage driving device of claim 12, wherein each of the first solid insulator and the second solid insulator comprises a ceramic material having different volumetric resistivity or permittivity.

17. The high voltage driving device of claim 12, wherein the first solid insulator and the second solid insulator comprise the same ceramic material and an impurity doped in the ceramic material, and the impurity doped in the first solid insulator has a concentration greater than that of the impurity doped in the second solid insulator.

18. The high voltage driving device of claim 12, wherein each of the first solid insulator and the second solid insulator comprises alumina ($Al_2O_3$) and titania ($TiO_2$) doped in the alumina, the titania doped in the alumina of the first solid insulator has a concentration of about 2% or more, and the titania doped in the alumina of the second solid insulator has a concentration less than about 2%.

* * * * *